Aug. 24, 1926.  
A. D. SINDEN  
1,597,393  
CONVEYER  
Filed July 6, 1925
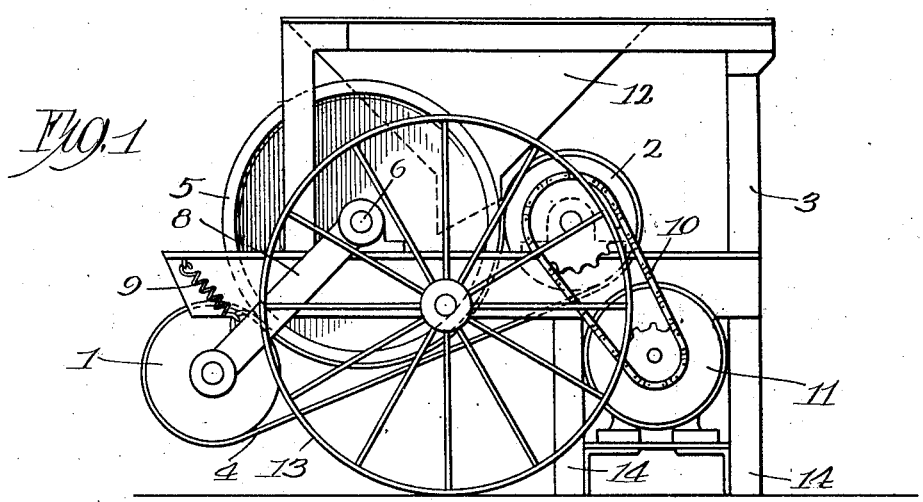
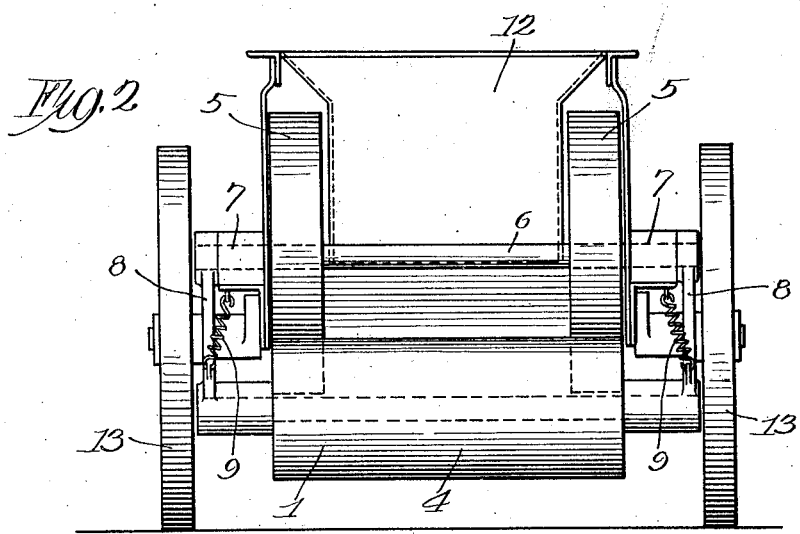
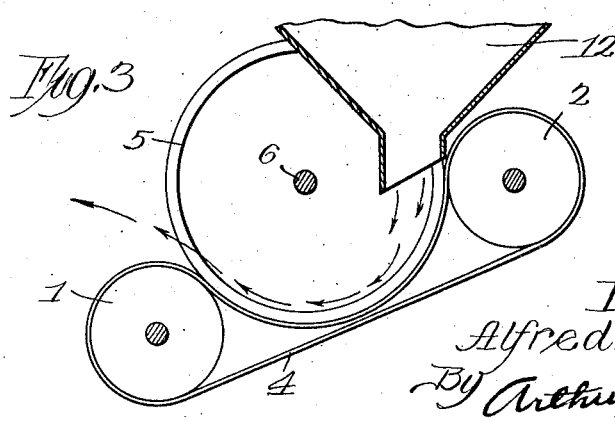
Inventor:  
Alfred D. Sinden  
By Arthur H. Durand  
Atty Patented Aug. 24, 1926.

1,597,393

UNITED STATES PATENT OFFICE.

ALFRED D. SINDEN, OF AURORA, ILLINOIS.

CONVEYER.

Application filed July 6, 1925. Serial No. 41,617.

This invention relates to conveyers, and more particularly to those in which a belt is employed to provide a supporting surface for the materials to be conveyed.

Generally stated, the object of the invention is to provide a conveyer which can be operated at high speed, and upon which materials delivered thereto will almost immediately acquire full speed, so that the materials will be discharged from the conveyer at the required speed, as in loading materials of certain kinds into cars, or other vehicles, or for other purposes.

It is also an object to provide certain details and features of construction and combinations tending to increase the general efficiency and the desirability of a conveyer adapted more particularly for use as a loader.

To these and other useful ends the invention consists in matters hereinafter set forth and claimed, and shown in the accompanying drawings, in which:—

Fig. 1 is a side elevation of a conveyer in the form of a loader embodying the principles of the invention.

Fig. 2 is a front elevation of said loader.

Fig. 3 is a vertical-longitudinal section of said conveyer.

As thus illustrated, the invention comprises the transverse rollers 1 and 2 suitably mounted on the body frame 3 of the machine, in the positions indicated, and a wide belt 4 supported on said loaders. The lower stretch of said belt may be taut, and may extend straight, as shown, but the upper stretch of the belt is curved and held in such form by the two rollers or idler wheels 5 mounted on a transverse axis member 6 supported in bearings 7 on the body frame. Thus the middle portion of the upper stretch of the belt is caused to operate on the line of a circle struck from the axis of the rollers or idler wheels 5, in the manner shown.

As shown, the roller 1 is preferably mounted on the body frame by means of arms 8 pivoted on the axis member 6 and held yieldingly in operative position by the springs 9 which connect the arms to the body frame, thus keeping the belt 4 pressed yieldingly against the under sides of the idler wheels 5 previously mentioned.

The roller 2 is driven by a sprocket and belt connection 10 to a motor 11 of any suitable character, so that the belt will be driven at the required speed.

A hopper 12 is mounted in position on the body frame 3, as shown, to deliver the materials to the belt between the rollers 1 and 2, but close to the roller 2, so that the materials will travel downwardly on the belt and then forwardly and then upwardly before being discharged therefrom. In this way, therefore, the materials while on the belt are subjected to the action of centrifugal force, inasmuch as the materials are forced to travel on the line of a circle struck from the axis of the member 6, and in this way, because of the action of centrifugal force, the materials tend to cling to the belt, and almost instantly acquire the full speed of the belt. If the belt were straight, it would slip under the materials, and the latter would not acquire the speed of the belt; but with the belt curved as shown, so that centrifugal force is employed to augment the gravity pressure of the materials on the belt, it is obvious that the materials will almost immediately acquire the full speed of the belt, and will be discharged from the conveyer, in the direction indicated by the arrow in Fig. 3, at the required speed necessary for loading materials into a car, or for any other purpose.

The entire machine is mounted on vehicle wheels 13, as shown, so that by tilting the legs 14 of the body frame off the ground, the entire machine can be moved around like a cart.

Thus a comparatively simple and inexpensive conveyer is provided, in the form of a loader, if desired for this purpose, which is comparatively light and of less size than machines heretofore employed for this purpose, and which can be moved around in a convenient manner. The rollers or idler wheels 5, being spaced apart, as shown, provide ample space between them for the discharge of the materials on to the belt, and for the conveying thereof downwardly and then forwardly and then upwardly, on the middle portion of the belt, in the manner shown. While the machine is in operation, centrifugal force tends to keep the portion of the belt between the idler wheels 5 from flexing or rising between the two wheels 5, so that the belt is maintained in condition to run at high speed and convey the materials thereon in the desired manner.

The two idlers 5 form side walls for the space between them, so that materials cannot escape at the sides of the belt. It will be understood, however, that the invention is not limited to the exact construction shown and described, and that any suitable or desired construction, involving the feature of a conveying surface which travels on the arc of a circle, to subject materials to centrifugal action thereon, may be employed without departing from the spirit of the invention.

Thus it will be seen that with the two discs or idlers 5 spaced apart, to provide a large volume of space between them and above the belt, the space above the curved surface of the belt is practically unobstructed, inasmuch as the axis member 6 is of comparatively small diameter, whereby there is practically no obstruction in the space between the belt and the horizontal plane of this axis. Furthermore, the curved conveying surface of the belt is practically entirely below the horizontal plane of said axis, and the discharge end of the curved surface is a substantial distance above the bottom of the circle of the periphery of said discs 5, so that the discharge is forward and upward. Also, the curved portion of the belt terminates at each end in the reverse curve of a smaller circle, and each smaller circle is of such diameter that a straight line tangent to the bottom of each circle is below the periphery of the larger circle of the two discs, whereby the only straight portion of said belt is that forming said tangential line. With this arrangement, the outlet of the hopper, and the hopper itself, are set low, which is important in a car loader, and the outlet of the hopper is at or close to the horizontal plane of the axis of the two discs, so that the materials are discharged practically immediately against the curved receiving end portion of the conveying surface of the belt. The entire apparatus is mounted on a pair of vehicle wheels, as explained, so that the structure can be tilted like a cart and wheeled about, and with the two portions 14 adapted to rest firmly on the ground, the cart will be held steady while the machine is in operation. The wide space between the two discs permits the use of a large hopper set low down to reduce the height of the machine, and preventing the materials from touching anything other than the belt and discs after leaving the hopper. The cart wheels are set forward of the center, it will be seen, and the motor is in the rear, or at least the greater part of the weight of the machine is in rear of the axis of the cart wheels, so that the rear end of the machine is weighted to hold it down when in use.

Without disclaiming anything, and without prejudice to any novelty disclosed, what I claim as my invention is:—

1. A conveyer machine comprising means to provide a conveying surface curved on the line of a circle struck from an axis above, so that materials carried on such surface will be subject to centrifugal action, causing the materials to bear with greater pressure against such surface, and instrumentalities for causing said means to have motion at the required speed about said axis, said means and instrumentalities comprising an endless conveyer belt and a pair of idler discs engaging said belt to form the said curved conveying surface, each disc being separate from the other, a shaft on which said discs are spaced apart and secured in spaced relation to provide a space between them which is unobstructed except by said shaft, and a hopper disposed with its lower portion in said space adjacent the receiving portion of the belt, said space thus permitting the use of a hopper of the desired size and in lower position to reduce the height of the machine, and preventing the materials from touching anything other than said belt and discs after leaving said hopper.

2. A conveyer machine comprising means to provide a conveying surface curved on the line of a circle struck from an axis above, so that materials carried on such surface will be subject to centrifugal action, causing the materials to bear with greater pressure against such surface, and instrumentalities for causing said means to have motion at the required speed about said axis, said means and instrumentalities comprising an endless belt and two separate discs and a shaft upon which said discs are spaced apart to provide a clear space between them above the belt, rolls for said belt in front and in rear of said discs, whereby the curved conveying portion of the belt terminates at each end in the reverse curve of one of said rolls, said rolls being of such diameter that a straight line tangential to the lower side of both rolls is immediately below the conveying portion of said belt, a hopper of ample size and feeding capacity and set down low in said space to reduce the height of the machine, preventing the materials from touching anything other than said belt and discs after leaving said hopper.

3. A conveyer machine comprising means to provide a conveying surface curved on the line of a circle struck from an axis above, so that materials carried on such surface will be subject to centrifugal action, causing the materials to bear with greater pressure against such surface, and instrumentalities for causing said means to have motion at the required speed about said axis, said means and instrumentalities comprising an endless conveyer belt and means including only two pulleys to conform the belt to the curve of said surface, the pulley at the discharge end of the curved conveying portion of the belt being movable, and spring means to keep this movable pulley in position to keep the belt tight.

4. A conveyer machine comprising means to provide a conveying surface curved on the line of a circle struck from an axis above, so that materials carried on such surface will be subject to centrifugal action, causing the materials to bear with greater pressure against such surface, and instrumentalities for causing said means to have motion at the required speed about said axis, in combination with a body frame for said means and instrumentalities, mounted upon a pair of cart wheels, whereby the entire apparatus can be tilted up and wheeled around as a push cart, with the axis of said vehicle wheels parallel with the axis of said conveying surface, and means to engage the ground behind and hold the cart steady when the apparatus is in use, the structure of the machine weighting the rear end of the machine to hold it down when in use.

Specification signed this 24th day of June, 1925.

A. D. SINDEN.